3,291,808
NAPHTHALENE DIAMINE COMPOUNDS AND
METHODS FOR THEIR PRODUCTION
Edward F. Elslager and Donald F. Worth, Ann Arbor,
Mich., assignors to Parke, Davis & Company, Detroit,
Mich., a corporation of Michigan
No Drawing. Filed Dec. 22, 1964, Ser. No. 420,450
6 Claims. (Cl. 260—326.85)

This application is a continuation of our copending application Serial No. 131,111, filed August 14, 1961, now abandoned.

This invention relates to diamine compounds, to acid-addition salts thereof, and to methods for obtaining the same. More particularly, the invention relates to novel N - (dialkylaminoalkyl) - 1,4 - naphthalenediamine compounds having in free base form the formula

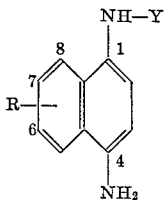

where Y represents a radical of the formula

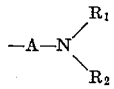

or a radical of the formula

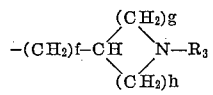

A represents an alkylene radical containing from 2 to 8 carbon atoms or an alkylene radical containing from 3 to 6 carbon atoms in which one of the non-terminal methylene groups (i.e., methylene groups not attached to the nitrogen atoms) is replaced by —O—, —S—, =CHOH, =COH(lower alkyl), =N(lower alkyl) or =CH(dilower alkylaminoalkyl); R represents hydrogen, methyl, or a chlorine or bromine atom, R being attached at the 6th, 7th, or 8th position of the naphthalene nucleus; $R_1$ and $R_2$ each represent an alkyl radical, a cycloalkyl radical, a hydroxyalkyl radical, or an alkoxyalkyl radical, said radicals containing fewer than 7 carbon atoms, the allyl or methallyl radicals, or a lower dialkylaminoalkyl radical containing 3 to 7 carbon atoms, of $R_1$ and $R_2$ in combination with the nitrogen atom to which they are attached represent a saturated heterocyclic ring containing from 4 to 12 carbon atoms (such as a pyrrolidine, piperidine, hexamethyleneamine, morpholine, piperazine, homopiperazine, decahydroquinoline, decahydroisoquinoline, azabicyclooctane, azabicyclononane, azabicyclodecane, hexahydroindoline, octahydroquinazoline, azaspiranonane, azaspiradecane, azaspiraundecane or octohydrocyclopentapyrrole ring) said heterocyclic ring optionally bearing lower alkyl, lower hydroxyalkyl, lower alkoxyalkyl, hydroxy, lower alkoxy, amino, or lower dialkylaminoalkyl substituents; $f$ represents an integer from 0 to 3 inclusive, $g$ and $h$ represent integers such that the sum of $g$ and $h$ is 3 or 4; and $R_3$ represents a lower alkyl, lower hydroxyalkyl, lower alkoxyalkyl, or a lower dialkylaminoalkyl radical.

The products of the invention are conveniently prepared by reduction of a 4-substituted-1-naphthylamine having in free base form the formula

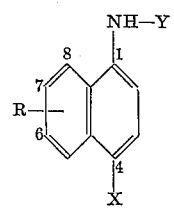

wherein X represents an aromatic carbocyclic azo group, a heterocyclic azo group or a nitro group and R and Y are as specified above.

The reduction can be carried out using either catalytic hydrogenation or chemical reducing agents. When catalytic hydrogenation is used, catalysts such as Raney nickel, palladium on carbon, and platinum are available. When using Raney nickel or palladium on carbon the hydrogenation is usually carried out at temperatures in the range from 20 to 150° C. at pressures between 1 to 10 atmospheres. The preferred temperature range for use with these catalysts is 20 to 50° C. The preferred pressure range is from 25 to 55 p.s.i.g. The reduction is usually carried out in neutral solution. Solvents such as water, lower alkanols, dioxane, tetrahydrofuran, dimethylacetamide, dimethylformamide, and the like, or mixtures thereof may be employed. Methanol is the solvent of preference. In those instances where a supported or unsupported platinum catalyst is used, the hydrogenation is usually carried out between 20 to 100° C. at a pressure of from 1 to 10 atmospheres. This reduction is usually carried out in acidic solution with aqueous acetic acid being the solvent of preference. In the catalytic hydrogenation the time of the reduction depends upon the rate of uptake of hydrogen. Normally the reduction is complete within one hour. Raney nickel and palladium on carbon are the preferred reagents for catalytic hydrogenation. As mentioned, the invention also contemplates reduction with any of various chemical reducing agents among which may be mentioned the following examples: tin-hydrochloric acid; ammonium sulfied, sodium sulfide and sodium bisulfide; iron-hydrochloric acid; stannous chloride-hydrochloride acid; aluminum amalgam in aqueous alcohol; and sodium hydrosulfite in aqueous alcohol. The reaction conditions vary depending upon the particular reducing agent employed. Tin-hydrochloric acid is employed in aqueous acid solution at a temperature from 20°C. to the boiling point of the solvent employed. Reduction with iron hydrochloric acid and stannous chloride-hydrochloric acid is also carried out under these same conditions. Ammonium sulfide, sodium sulfide, or sodium bisulfide is employed in a solvent such as water, a lower alkanol, tetrahydrofuran, dimethylacetamide, and the like, or mixtures thereof under neutral or slightly alkaline reaction conditions. Ammonium sulfide and stannous chloride-hydrochloric acid are the preferred reducing agents. Preparation of azo intermediates used as starting materials is described in copending application Serial No. 131,110 filed August 14, 1961, now issued as Patent No. 3,218,309. Reduction by means of a chemical reducing agent is usually complete within one hour. Where the starting material is an azo compound and for that reason a colored substance, the reduction can easily be followed by the disappearance of color.

The compounds of the invention posses valuable antiparasitic properties when administered in dosage form by the oral or parenteral routes. More particularly, the compounds are lethal for *Schistosoma mansoni*, a causative agent of schistosomiasis. Hence, the compounds have application as therapeutic agents for combatting schistosomiasis infection. The compounds of the invention also are effective against the parasite *Trichomonas vaginalis*. Further, they are useful as intermediates for the preparation of other chemical compounds having valuable antiparasitic and chemotherapeutic properties.

For their antiparasitic effect the compounds are employed preferably in the form of their pharmaceutically acceptable addition salts with an organic or inorganic acid. For convenience, the addition salt with hydrochloric acid is usually preferred. Other salts are the hydrobromide, hydroiodide, sulfate, phosphate, oxalate, sulfamate, sulfonate (especially the naphthalene 1,5-disulfonate), acetate (especially the phenoxyacetates), lactate, tartrate, gluconate, citrate, succinate, maleate, mandelate, oleate, tannate, alkylsulfonate (especially the ethanesulfonate), penicillinate, benzoate, cresotinate (especially the methylene-di-o-cresotinate), salicylate (especially the 5,5'-methylenedisalicylate and 3- and 5-phenylsalicylates), naphthoate (especially the 3-hydroxy-2-naphthoate), 4,4'-methylenebis(3-hydroxy-2-naphthoate), and 1,4,5,8-naphthalenetetracarboxylate, pyromellitate, 8-hydroxy-7-iodo-5-quinoline sulfonate, cyclopentylpropionate, cyclohexane carboxylate, arsanilate and the arsonate. Salts of particular interest are those with inorganic antimony derivatives such as antimony trichloride, and the compounds known to possess activity against schistosomiasis such as phthalic acid mono-4-(3'-chloro-4'-methylphenyl)-piperazide,
maleic acid mono-4-(3'-chloro-4'-methylphenyl)-piperazide,
pyridine-2,3-dicarboxylic acid mono-4-(3'-chloro-4'-methylphenyl)-piperazide,
succinic acid mono-4-(3'-chloro-4'-methylphenyl-piperazide,
oxalic acid mono-4-(3'-chloro-4'-methylphenyl)piperazide,
maelic acid mono-4-(3'-bromo-4'-methylphenyl)piperazide,
adipic acid mono-4-(3'-chloro-4'-methylphenyl)-piperazide,
glutaric acid mono-4-(3'-chloro-4'-methylphenyl)-piperazide,
terephthalic acid mono-4-(3'-chloro-4'-methylphenyl)-piperazide,
diglycollic acid mono-4-(3'-chloro-4'-methylphenyl-piperazide,
N,N'-[heptamethylenebis-(oxy-p-phenylene)]-diglycine,
N,N'-[heptamethylenebis-(oxy-p-phenyl)]-di-β-alanine,
[heptamethylenebis-(oxy-p-phenylenenitrilo)]-tetraacetic acid,
and organic antimony derivatives such as
2-hydroxy-5-oxo-1,3,2-dioxastibiolane-4-glycolic acid,
2-(4,6-disulfo-1,3,2-benzodioxastibiol-2-yloxyl)-1-phenyl-3,5-disulfonic acid, and
antimony-2,3-dimercaptosuccinate.

The invention is illustrated by the following examples.

Example 1

(a) To a solution of 100 g. (0.29 mole) of N,N-diethyl-N'-(4-phenylazo-1-naphthyl)-ethylenediamine in 600 ml. of ethanol is added 5 g. of Raney nickel. The mixture is shaken under hydrogen at an initial pressure of 55 p.s.i.g. until the hydrogen uptake is complete. After removing the catalyst by filtration, a large excess of hydrogen chloride dissolved in 2-propanol is added to the filtrate. The product, which crystallizes upon cooling, is collected by filtration. Crystallization of this crude product from dilute hydrochloric acid gives the desired N-(2-diethylaminoethyl)-1,4-naphthalenediamine, dihydrochloride, hemihydrate, as a colorless, crystalline solid, of formula:

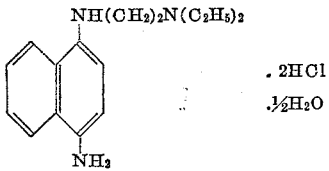

M.P. 220–225° C. (dec.).

N,N-diethyl-N'-(4-phenylazo-1-naphthyl)ethylenediamine, employed as a starting material in the above procedure, can be prepared as follows: a mixture of 570 g. (4 moles) of 1-naphthylamine, 690 g. (4 moles) of 2-chlorotriethylamine, hydrochloride, 1250 g. (9 moles) of anhydrous potassium carbonate, 3 l. of benzene and 20 g. of copper-bronze powder is stirred and boiled under reflux for 18 hours. The mixture is cooled and 5 l. of 5% sodium hydroxide and 1 l. of ether are added. The mixture is stirred vigorously for one-half hour, the layers are allowed to separate, and the aqueous layer is siphoned off. The alkaline solution is extracted with several portions of ether, benzene or chloroform, and the combined organic extracts are added to the benzene-ether layer. The combined solvent mixture is washed twice with water, once with saturated sodium chloride solution and dried over anhydrous magnesium sulfate. The drying agent is collected by filtration and the filtrate concentrated in vacuo on the steam bath. Vacuum distillation of the residue through a 10-inch Vigreux column gives the desired N,N-diethyl-N'-naphthylethylenediamine as a pale yellow oil, B.P. 170–172° C./1.5 mm., $n_D^{25}$ 1.5903.

Subsequently, a solution of 93.1 g. (1.0 mole) of aniline in 2 l. of water containing 250 ml. (3.0 moles) of concentrated hydrochloric acid is cooled to 0° C., and the amine diazotized by the portionwise addition of a solution of 69.0 g. (1.0 mole) of sodium nitrite in 300 ml. of water. This diazonium salt solution is then added slowly to a solution of 242 g. (1.0 mole) of N,N-diethyl-N'-naphthylethylenediamine in 4 l. of water containing 170 ml. (2.0 moles) of concentrated hydrochloric acid. In order to disperse the thick mush which forms near the end of the coupling, 4 additional liters of cold water are added to the reaction mixture. The temperature is maintained below 5° C. during both the diazotization and coupling reactions. After stirring at room temperature for 3 hours, the resulting deep purple reaction mixture is made alkaline by the addition of saturated sodium hydroxide solution, whereupon an orange tar separates. This is caused to solidify by trituration with cold, dilute sodium hydroxide. The product is collected by filtration, dried in vacuo at room temperature and then at 40° C., and crystallized from n-heptane to give shimmering, red crystals of N,N-diethyl-N'-(4-phenylazo-1-naphthyl)ethylenediamine, M.P. 62° C.

The crude tar is also readily converted to hydrochloride salts. Thus, the tar is dissolved in ether, the solution dried over anhydrous potassium carbonate, and the drying agent removed by filtration. After the addition of excess anhydrous hydrogen chloride to the red solution, the dihydrochloride salt of N,N-diethyl-N'-(4-phenylazo-1-naphthyl)ethylenediamine precipitates and is collected by filtration. This salt is obtained as a purple solid, M.P. 155° C. (dec.).

Alternatively, to a dry solution of the crude tar in acetone there is added an equimolar amount of anhydrous hydrogen chloride solution in 2-propanol. The orange-red monohydrochloride salt which precipitates is collected by filtration and dried in vacuo.

(b) A solution of 34.6 g. (0.10 mole) of N,N-diethyl-N'-(4-phenylazo-1-naphthyl)ethylenediamine in ethanol is added slowly to a hot solution of 68 g. of stannous chloride, dihydrate in 600 ml. of concentrated hydrochloric acid. The reaction mixture is rapidly decolorized and near the end of the addition precipitation begins. The reaction mixture is cooled and the colorless precipitate collected by filtration. This material is dissolved in water and the solution is made strongly alkaline with concentrated sodium hydroxide solution. This mixture is extracted with chloroform and the chloroform extracts are dried over anhydrous potassium carbonate, diluted with ether, and treated with anhydrous hydrogen chloride. The product which precipitates is collected by filtration and crystallized from dilute hydrochloric acid. This product, N-(2-diethylaminoethyl)-1,4-naphthalenediamine, dihydrochloride, hemihydrate, is identical with the product of Example 1a.

(c) A solution of 10 g. (0.035 mole) of N,N-diethyl-N'-(4-nitro-1-naphthyl)ethylenediamine in 200 ml. of methanol is hydrogenated over 1 g. of Raney nickel at an initial pressure of 52 p.s.i.g. and the catalyst is removed by filtration. About 50 ml. of 25% hydrogen chloride in 2-propanol is added and the solution concentrated until precipitation begins. After cooling, the product is collected by filtration. Crystallization from dilute hydrochloric acid gives the desired N-(2-diethylaminoethyl)-1,4-naphthalenediamine, dihydrochloride, hemihydrate, which is identical with the product of Example 1a.

N,N-diethyl - N'(4-nitro-1-naphthyl)ethylenediamine, used as an intermediate in the preparation of this compound, can be prepared as follows: a mixture of 45.8 g. (0.22 mole) of 1-chloro-4-nitronaphthalene and 77 g. (0.66 mole) of N,N-diethylethylenediamine is heated on a steam bath for 3 hours. Volatile materials are removed under a moderate vacuum, and the residue is crystallized from 2-propanol. This is the desired N,N-diethyl-N' - (4-nitro-1 - naphthyl)ethylenediamine, M.P. 80–83° C. 1-bromo- or 1-iodo-4-nitronaphthalene may be used in place of the 1-chloro-4-nitronaphthalene.

Alternatively the N,N-diethyl-N'-(4-nitro-1-naphthyl)ethylenediamine may be prepared in the following manner: a mixture of 18.8 g. (0.10 mole) of 4-nitro-1-naphthylamine, 18.9 g. (0.11 mole) of 2-chlorotriethylamine, hydrochloride, and 27.6 g. (0.20 mole) of potassium carbonate is boiled under reflux for 16 hours in 500 ml. of benzene. After cooling to room temperature, 1 l. of 5% aqueous sodium hydroxide is added, and the benzene layer is separated and dried over anhydrous potassium carbonate. After filtration and concentration of the filtrate under reduced pressure the residue is purified by crystallization from 2-propanol. The product is the desired N,N-diethyl-N'-(4-nitro-1 - naphthyl)ethylenediamine.

(d) A slurry of 38.0 g. (0.10 mole) of 5-[4-(2-diethylaminoethylamino)-1-naphthylazo]-uracil in ethanol is hydrogenated over Raney nickel at 54–23 p.s.i.g. When reduction is complete, the catalyst is removed by filtration and the filtrate is acidified with a large excess of hydrogen chloride in 2-propanol. Upon cooling, the precipitate which is formed is collected by filtration. This crude product is digested several times with 300 ml. portions of 2-propanol, and then recrystallized from dilute hydrochloric acid to give N-(2-diethylaminoethyl)-1,4-naphthalenediamine, dihydrochloride, hemihydrate, identical with the product of Example 1(a).

The 5-[4-(2-dethylaminoethylamino)-1-naphthylazo]-uracil used as a starting material is prepared as follows: a solution of 41.2 g. (0.325 mole) of 5-aminouracil in 1 l. of 50% ethanol and 85 ml. (1 mole) of concentrated hydrochloric acid is cooled to 0° C. The amine is diazotized by the slow, portion-wise addition of a solution of 22.4 g. (0.325 mole) of sodium nitrite in 200 ml. of water. The mixture is stirred 15 minutes at 0° C., then added slowly at 0° to 5° C. to a solution of 78.7 g. (0.325 mole) of N,N-diethyl-N'-(1-naphthyl)ethylenediamine in 1 l. of 95% ethanol and sufficient concentrated hydrochloric acid to make the solution acidic to Congo red. The deep purple solution which forms immediately changes slowly to a green slurry as the hydrochloride salt begins to precipitate. The suspension is stirred about 1 hour at 0° C. The pH is adjusted to approximately 8 by the addition of sodium hydroxide solution and the red product is collected by filtration. Upon crystallization from ethanol the desired 5-[4-(2-diethylaminoethylamino)-1-naphthylazo]uracil is obtained as a red crystalline solid of M.P. 210–211° C. (dec.).

(e) A solution of 4.9 g. (0.010 mole) of N,N''-(azodi-1,4 - naphthalene)bis[N',N'-diethylethylenediamine] in methanol is reduced in the manner given under Example 1(a). The product, N-(2-diethylaminoethyl)-1,4-naphthalenediamine, dihydrochloride, hemihydrate, is identical with the product of Example 1(a) after recrystallization from dilute hydrochloric acid.

The required starting material can be obtained as follows: a solution of 5.3 g. (0.014 mole) of N-(2-diethylaminoethyl) - N - (4 - amino-1-naphthyl)trifluoroacetamide, monohydrochloride in 50 ml. of water containing 2.5 ml. of concentrated hydrochloric acid is cooled to 0 °C. There is added rapidly 13.6 ml. of 1 N sodium nitrite in water, the temperature being kept below 5° C. The resulting red solution is added slowly to a cold solution containing 3.3 g. (0.014 mole) of N,N-diethyl-N'-naphthylethylenediamine and 7.5 ml. of concentrated hydrochloric acid in 150 ml. of water. The resulting gelatinous, purple mixture is allowed to warm slowly to room temperature whereupon there is added 170 ml. of 1 M sodium bicarbonate solution. The mixture is extracted with ether, and the red, ethereal solution dried over anhydrous magnesium sulfate. Upon filtration and concentration of the filtrate to dryness, there is obtained a green-red solid. This is dissolved in 75 ml. of methanol and 25 ml. of 2 N sodium hydroxide in methanol is added. The tarry mixture which forms immediately, changes to a solid precipitate upon stirring for about 1 hour. This solid is collected by filtration and recrystallized from a mixture of ethanol and acetone to yield the desired intermediate, N,N''-(azodi - 1,4 - naphthalene)-bis[N',N'-diethylethylenediamine], as a red-brown, crystalline solid, M.P. 163–165° C.

The N-(4-amino-1-naphthyl)-N-(2-diethylaminoethyl)-2,2,2-trifluoroacetamide, monohydrochloride is obtained in the following manner: a solution of 203 g. (0.59 mole) of N,N - diethyl-N'-(4-phenylazo-1-naphthyl)ethylenediamine in 710 ml. of N,N-dimethylformamide is placed in a 2 l. flask and treated over a period of 1 hour with a solution of 147 g. (0.70 mole) of trifluoroacetic anhydride in 100 ml. of N,N-dimethylformamide with continuous stirring. During the addition, an exothermic reaction occurs, the temperature rising to 49° C. After standing at room temperature for 16 hours, the resulting mixture is poured into 2 l. of an ice-water mixture, and 800 ml. of 1 molar aqueous sodium bicarbonate is cautiously added. The viscous, dark red mass which separates is extracted from the cold aqueous medium with two 1 l. portions of benzene, the combined benzene extracts are washed successively with water and saturated sodium chloride solution and dried over anhydrous magnesium sulfate. The drying agent is removed by filtration and the benzene evaporated in vacuo on the steam bath. The residue is dissolved in 500 ml. of absolute methanol and 160 ml. of 4 N ethanolic hydrogen chloride is added, followed by 10 l. of anhydrous ether. The orange crystals of N-(2-diethylaminoethyl)-N-(4-phenylazo-1-naphthyl) - 2,2,2 - trifluoroacetamide, monohydrochloride, which separate are collected by filtration, washed with ether and dried in vacuo; M.P. 206–208° C.

Eighty-eight grams (0.18 mole) of the above trifluoroacetamide is dissolved in 600 ml. of methanol and hydrogenolyzed in the presence of 5 g. of Raney nickel catalyst at 23–35° C. under 54–26 p.s.i.g. of hydrogen. The catalyst is removed by filtration and the filtrate evaporated under reduced pressure to give a mushy crystalline residue which is diluted with ether, filtered, and the precipitate which is collected by filtration is washed thoroughly with ether. Crystallization from ethanol gives the desired N-(2-diethylaminoethyl)-N-(4-amino - 1 - naphthyl)-2,2,2-trifluoroacetamide, monohydrochloride as fine white needles, M.P. 216–218° C.

(f) A mixture of p-[4-(2-diethylaminoethylamino)-1-naphthylazo]benzenesulfonic acid, triethylamine, and Raney nickel in methanol is shaken under hydrogen as described in Example 2. The product, N-(2-diethylaminoethyl)1,4 - naphthalenediamine, dihydrochloride, hemihydrate, upon crystallization from dilute hydrochloric acid, is identical with the product of Example 1(a).

The p-[4-(2-diethylaminoethylamino)-1-naphthylazo] benzenesulfonic acid can be prepared from N,N-diethyl-N'-(1-naphthyl)-ethylenediamine and sulfanilic acid using the procedure given under Example 1(d). This compound is a red, crystalline solid, M.P. 243–244° C.

(g) To a solution of 14.0 g. (0.040 mole) of N,N-diethyl-N'-(4-phenylazo-1-naphthyl) - ethylenediamine in 100 ml. of ethanol there is added portionwise 40 ml. of ammonium sulfide solution, the temperature being maintained at about 75° C. The mixture is filtered, and the filtrate concentrated in vacuo. The orange residue is dissolved in ether and an excess of ethereal hydrogen chloride is added. The precipitate is collected by filtration and recrystallized from dilute hydrochloric acid to obtain N-(2-diethylaminoethyl)-1,4-naphthalenediamine, dihydrochloride, hemihydrate identical with the product of Example 1(a).

(h) A solution of 13.4 g. (0.030 mole) of 4,4'-methylenebis-[3-hydroxy-2-naphtholic acid], disodium salt, monohydrate in 200 ml. of water is added slowly to a solution of 10 g. (0.030 mole) of N-(2-diethylaminoethyl)-1,4-naphthalenediamine, dihydrochloride, hemihydrate in 250 ml. of warm water. The precipitate which forms is collected by filtration and dried in vacuo. This product, N-(2-diethylamnioethyl) - 1,4 - naphthalenediamine, salt with one formula weight 4,4'-methylenebis[3-hydroxy-2-naphthoic acid], monohydrate, is an off-white powder of formula:

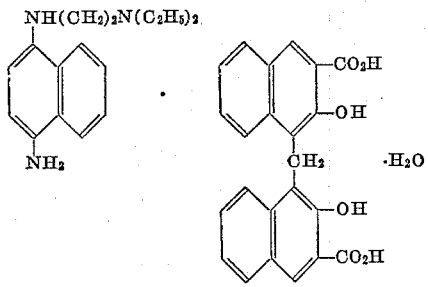

M.P. 195–205° C. (dec.).

(i) A water solution of 10.0 g. (0.030 mole) of N-(2-diethylaminoethyl)-1,4-naphthalenediamine, dihydrochloride, hemihydrate is made alkaline with ammonium hydroxide and the base is extracted into benzene. The dried benzene solution is then added rapidly with stirring to a solution of 20.5 g. (0.09 mole) of antimony trichloride in benzene. The salt is collected by filtration and dried in vacuo at 40° C. The product, N-(2-diethylaminoethyl)-1,4,-naphthalenediamine, salt with 2½ formula weights of antimony trichloride, contains two moles of water and melts at 90–94° C.

(j) A solution of 20 g. (0.06 mole) of N-(2-diethylaminoethyl) - 1,4-naphthalenediamine, dihydrochloride, hemihydrate in 150 ml. of water is added rapidly to a warm solution of 21.8 g. (0.06 mole) of 1,5-naphthalenedisulfonic acid, disodium salt, dihydrate in 150 ml. of water with vigorous stirring. The off-white crystals are collected by filtration, recrystallized from water, and dried in vacuo. This is the desired N-(2-diethylaminoethyl)-1,4-naphthalenediamine salt with one formula weight 1,5-naphthalenedisulfonic acid, monohydrate, M.P. 260–262° C.

(k) A solution of 1.4 g. (0.0042 mole) of N-(2-diethylaminoethyl) - 1,4-naphthalenediamine, dihydrochloride, hemihydrate, in water stabilized with sodium hydrosulfite is added rapidly to a solution of 2.0 g. (0.0014 mole) of 8,8'{ureylenebis[m-phenylenecarbonylimino(4-methyl - m - phenylene)carbonylimino]}-di-1,3,5-naphthalenetrisulfonic acid, hexasodium salt in water. The white solid thus obtained is collected by filtration and dried in vacuo. This is the desired N-(2-diethylaminoethyl)-1,4-naphthalenediamine, salt with ⅓ formula weight 8,8' - {ureylenebis[m-phenylenecarbonylimino(4-methyl - m - phenylene)carbonylimino]}-di-1,3,5-naphthalenetrisulfonic acid, hydrate, M.P. >300° C.

*Example 2*

A solution of 35 g. (0.097 mole) of N,N-diethyl-N'-(4-phenylazo-1-naphthyl)-1,3-propanediamine in 200 ml. of methanol containing 3 g. of Raney nickel is hydrogenated according to the conditions outlined in Example 5. After crystallization from a mixture of methanol and 2-propanol, the desired N-(3-diethylaminopropyl)-1,4-naphthalenediamine, dihydrochloride, of formula:

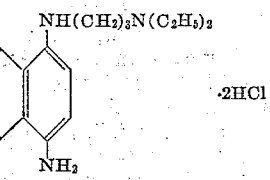

melts at 200–210° C. (dec.).

Utilizing the preparative methods described under Example 1 herein, the following related N-(dialkylaminoalkyl)-1,4-napthalenediamines can be prepared starting from the corresponding N,N-dialkyl-N'-(4-arylazo- or 4-nitro-1-naphthyl)alkanediamine:

N-(3-dimethylaminopropyl)-1,4-naphthalenediamine, trihydrochloride, M.P. 243–260° C. (dec.)
N-(2-diisobutylaminoethyl)-1,4-naphthalenediamine, dihydrochloride, M.P. 240–242° C.
N-(2-dimethylaminoethyl)-1,4-naphthalenediamine, dihydrochloride
N-(3-dihexylaminoethyl)-1,4-naphthalenediamine, dihydrochloride
N-(2-diisopropylaminoethyl)-1,4-naphthalenediamine, dihydrochloride

*Example 3*

A suspension of 31.7 g. (0.085 mole) of 4-[3-(4-phenylazo-1-naphthylamino)propyl]morpholine in 300 ml. of methanol is hydrogenated in the manner described under Example 1(a) herein. The product, M.P. 206–208° C., is 4-[3-(4-amino-1-naphthylamino)propyl]morpholine, dihydrochloride monohydrate, and has the formula:

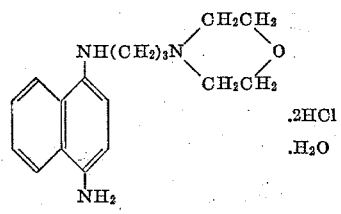

In like manner, the following related 4-[(4-amino-1-naphthylamino)alkyl]morpholine compounds can be prepared, starting from the corresponding 4-[(4-azo-1-naphthylamino)alkyl]morpholines:

4-[2-(4-amino-1-naphthylamino)ethyl]morpholine, dihydrochloride, M.P. 195–200° C.
4-[3-(4-amino-1-naphthylamino)propyl]-2,6-dimethylmorpholine, dihydrochloride
4-[2-(4-amino-1-naphthylamino)ethyl]-3,3-dimethylmorpholine, dihydrochloride
4-[6-(4-amino-1-naphthylamino)hexyl]morpholine, dihydrochloride

Example 4

A mixture of 51 g. (0.10 mole) of p-{4-{2-[(2-diisopropylaminoethyl)methylamino]ethylamino}-1 - naphthylazo}benzenesulfonic acid, 14 ml. of triethylamine, and 3 g. of Raney nickel in methanol is shaken under hydrogen at an initial pressure of 55 p.s.i.g. until 0.2 mole of hydrogen is absorbed. The catalyst is removed by filtration, and the filtrate concentrated in vacuo. The residue is dissolved in chloroform and the chloroform solution is washed successively with several portions of water and dilute aqueous sodium hydroxide. The chloroform solution is dried over anhydrous potassium carbonate, filtered, diluted with ether, and treated with an excess of anhydrous hydrogen chloride. The precipitate which forms is collected by filtration and crystallized from a mixture of ethanol and ether containing an excess of hydrogen chloride. The product, 1,1-diisopropyl-4-methyl-7-(4-amino-1-naphthyl)diethylenetriamine, trihydrochloride, of formula:

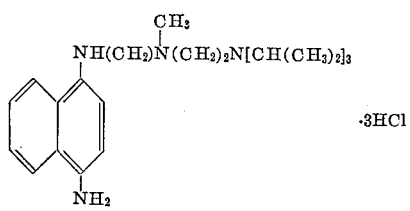

is obtained as a grey powder.

In like manner, the following related 1,4-diamino-naphthalenes can be prepared by reduction of the appropriate {{[(dialkylaminoalkyl)alkylamino]alkylamino}-1 - naphthylazo}-derivatives:

7-(4-amino-1-naphthyl)-1,1,4-triethyldiethylenetriamine trihydrochloride, monohydrate, M.P. 174–178° C.
1-{2-{[2-(4-amino-1-naphthylamino)ethyl]methylamino} ethyl}-4-methylpiperazine, tetrahydrochloride
1-(4-amino-1-naphthylamino)-3-[(2-diethylaminoethyl) ethylamino]-2-methyl-2-propanol, trihydrochloride
1-{2-{[2-(4-amino-1-naphthylamino)ethyl]methylamino}ethyl}pyrrolidine, trihydrochloride
N-{6-[(2-dimethylaminoethyl)methylamino]hexyl}-1,4-naphthalenediamine, trihydrochloride
2-{[2-(4-amino-1-naphthylamino)ethyl](2-diethylaminoethyl)amino}ethanol, trihydrochloride
1-{2-{[2-(4-amino-1-naphthylamino)ethyl]methylamino}ethyl}piperidine, trihydrochloride

Example 5

A solution of 59 g. (0.15 mole) of N,N-diethyl-2,2-dimethyl-N'-(4-phenylazo-1-naphthyl) - 1,3 - propanediamine in ethanol is hydrogenated over 0.5 g. of palladium on charcoal catalyst using an initial hydrogen pressure of 52 p.s.i.g. After the theoretical hydrogen uptake is complete, the catalyst is removed by filtration, and 2-propanol containing 25% hydrogen chloride is added to the filtrate. The resulting solution is concentrated by evaporation at atmospheric pressure until the material begins to precipitate. The mixture is cooled and the product is collected by filtration and crystallized from a mixture of ethanol and hydrchloric acid. Upon drying, the product melts with decomposition at 192–194° C. This is the desired N-(3-diethylamino-2,2-dimethylpropyl) - 1,4 - naphthalenediamine, trihydrochloride, hemihydrate, of formula:

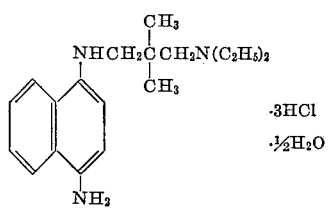

In like manner, the following related N-(3-dialkylamino-2,2-dimethylpropyl)-1,4-naphthalenediamines can be prepared, starting from the appropriate N,N-dialkyl-2,2-dimethyl-N'-(4-azo-1-naphthyl)-1,3-propanediamines·

N-(3-dimethylamino-2,2-dimethylpropyl) - 1,4 - naphthalenediamine, trihydrochloride
1-[3-(4-amino-1-naphthylamino)-2,2-dimethylpropyl] piperidine, trihydrochloride
1-[3-(4-amino-1-naphthylamino)-2,2-dimethylpropyl] 4-methylpiperazine, tetrahydrochloride
N-{3-[bis(2-methoxyethyl)-amino]-2,2-dimethylpropyl} 1,4-naphthalenediamine, trihydrochloride
1-[3-(4-amino-1-naphthylamino)-2,2-dimethylpropyl] pyrrolidine, trihydrochloride
4-[3-(4-amino-1-naphthylamino)-2,2-dimethylpropyl] morpholine, trihydrochloride
2-{[3-(4-amino-1-naphthylamino)-2,2-dimethylpropyl] ethylamino}ethanol, trihydrochloride

Example 6

To a solution of 39.0 g. (0.10 mole) of 2-[2-(4-phenylazo-1-naphthylamino)ethoxy]triethylamine, dihydrochloride in methanol, there is added 1 g. of palladium on charcoal catalyst. The mixture is shaken under hydrogen at an initial pressure of 55 p.s.i.g. until the calculated amount of hydrogen has been absorbed. After removal of the catalyst by filtration and addition of excess hydrogen chloride to the filtrate, the methanol is removed in vacuo. The residue is crystallized twice from a mixture of 2-propanol and ethanol to free the desired product from aniline hydrochloride. This product, N-[2-(2-diethylaminoethoxy)ethyl]-1,4-naphthalenediamine dihydrochloride, has the formula:

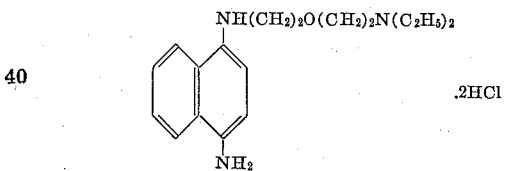

Utilizing the preparative methods described under Examples 1 through 6 herein, the following related N-[(dialkylaminoalkoxy)alkyl] - 1,4 - naphthalenediamine compounds can be prepared by reduction of the corresponding 1[(dialkylaminoalkoxy)alkylamino] - 4-azonaphthalenes:

N-[2-(2-dimethylaminoethoxy)ethyl] - 1,4 - naphthalenediamine, dihydrochloride
N-[5 - (dimethylaminomethyl)tetrahydrofurfuryl] - 1,4-naphthalenediamine, dihydrochloride
1-{2-[2-(4-amino-1-naphthylamino)ethoxy]ethyl}-piperidine, dihydrochloride
N¹-[3-(3-diethylaminopropoxy)propyl]-6-methyl-1,4-naphthalenediamine, dihydrochloride
7-chloro-N¹-[2-(2-dipropylaminoethoxy)ethyl]1,4-naphthalenediamine, dihydrochloride
N-[3-(4-diethylamino-1-methylbutoxy)propyl]-1,4-naphthalenediamine, dihydrochloride
N-[2-(2-dibutylaminoethoxy)ethyl]-1,4-naphthalenediamine, dihydrochloride

Example 7

A mixture of 55.0 g. (0.10 mole) of p-{4-{2-[4-(2-piperidinoethyl)piperidino]ethylamino}-1 - naphthylazo} benzenesulfonic acid, 14 ml. of triethylamine, and 3 g. of Raney nickel is hydrogenated according to the process of Example 4. After crystallization from a mixture of methanol and ether containing excess hydrogen chloride, the product, 1-[2-(4-amino-1-naphthylamino)ethyl]-1,4- ethylene-dipiperidine, trihydrochloride, is obtained as a hygroscopic, off-white crystalline solid. The formula is:

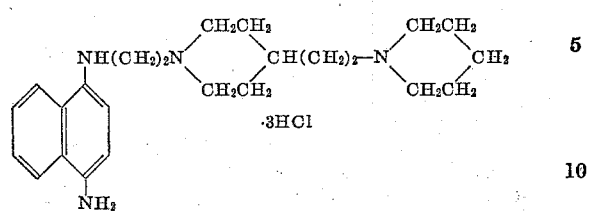

In like manner, the following related 1-[(4-amino-1-naphthylamino)alkyl](dialkylaminoalkyl)piperidines can be prepared, starting from the appropriate 1-[(4-aryl or heterocyclicazo - 1 - naphthylamino)alkyl](dialkylaminoalkyl)piperidines:

1-[3-(4-amino-1-naphthylamino)propyl]-2-(2-dimethylaminoethyl)piperidine, trihydrochloride
1-[2-(4-amino-1-naphthylamino)ethyl]-4-[2-(1-pyrrolidinyl)ethyl]piperidine, trihydrochloride
1-[6-(4-amino-1-naphthylamino)hexyl]-2-(2-diethylaminoethyl)piperidine, trihydrochloride
1-[2-(4-amino-6-chloro-1-naphthylamino)ethyl]-4-(2-diethylaminoethyl)piperidine, trihydrochloride
4-{2-{1-[2-(4-amino-1-naphthylamino)ethyl]-2-piperidyl}ethyl}morpholine, trihydrochloride
2-{{2-{1-[3-(4-amino-1-naphthylamino)propyl]-4-piperidyl}ethyl}ethylamino}ethanol, trihydrochloride

*Example 8*

A solution of 45.4 g. (0.10 mole) of N-[2-(2-diethylaminoethylthio)ethyl]-4-phenylazo-1 - naphthylamine, hydrochloride, in ethanol is reduced in the manner given in Example 1(b). The product, after crystallization from a mixture of ethanol and ether containing excess hydrogen chloride, is obtained as a colorless, crystalline solid. This product, N-[2 - (2 - diethylaminoethylthio)ethyl] - 1,4-naphthalenediamine, dihydrochloride, has the formula:

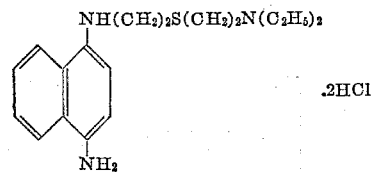

In like manner, the following related N-[(dialkylaminoalkylthio)alkyl]-1,4-naphthalenediamines can be prepared, starting from the corresponding N-[(dialkylaminoalkylthio)alkyl]-4-azo-1-naphthylamines:

4-{2-[3-(4-amino-1-naphthylamino)propylthio]ethyl}morpholine, dihydrochloride
N-[2-(3-dimethylaminopropylthio)ethyl]-1,4-naphthalenediamine, dihydrochloride
N-[3-(2-diethylaminoethylthio)propyl]-1,4-naphthalenediamine, dihydrochloride
7-chloro-N¹-[2-(3-diethylaminopropylthio)ethyl]-1,4-naphthalenediamine, dihydrochloride
1-{2-[3-(4-amino-1-naphthylamino)propylthio]ethyl}piperidine, dihydrochloride
N-[3-(3-diethylaminopropylthio)propyl]-1,4-naphthalenediamine, dihydrochloride

*Example 9*

A solution of 31.3 g. (0.10 mole) of N,N-dimethyl-N'-(4-nitro-1-naphthyl)-1,4-cyclohexanediamine in ethanol is hydrogenated in the manner described under Example 1(c). The product, N-(4-dimethylaminocyclohexyl)-1,4-naphthalenediamine, trihydrochloride, is a tan, crystalline solid, of formula:

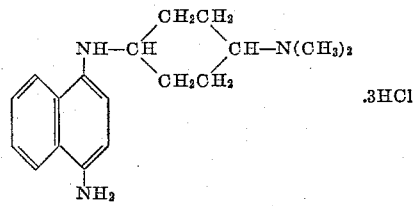

Utilizing the preparative methods described under Examples 1 through 6 herein, the following related N-[(dialkylamino)cycloalkyl]-1,4-naphthalenediamines can be prepared, starting from the appropriate 4-azo- or nitro-1-[(dialkylamino) - cycloalkylamino]naphthalene compounds:

N-(2-dimethylaminocyclohexyl)-1,4-naphthalenediamine, trihydrochloride
N-(3-diethylaminocyclohexyl)-1,4-naphthalenediamine, trihydrochloride
N-[2-(dimethylaminomethyl)cyclohexyl]-1,4-naphthalenediamine, trihydrochloride
N-(4-diethylaminocyclohexyl)-1,4-napthalenediamine, trihydrochloride
N-(4-dibutylaminocyclohexyl)-1,4-naphthalenediamine, trihydrochloride
N-[2-(2-diethylaminoethyl)cyclopentyl]-1,4-naphthalenediamine, trihydrochloride
7-bromo-N¹-(4-diethylaminocyclohexyl)-1,4-naphthalenediamine, trihydrochloride
N-[2-(diethylaminomethyl)cyclohexyl]-1,4-naphthalenediamine, trihydrochloride

*Example 10*

To solution of 28.3 g. (0.059 mole) of 1-methyl-4-[2-(4 - phenylazo-1-naphthylamino)ethyl]piperazine, trihydrochloride is added 0.5 g. of 20/ palladium on carbon catalyst. The mixture is hydrogenated under the conditions of Example 5. After crystallization from a mixture of methanol and 2-propanol, the desired product, 1 - [2-(4-amino-1-naphthylamino)ethyl]-4-methylpiperazine, trihydrochloride, of formula:

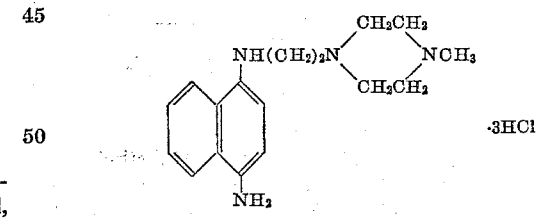

is obtained, M.P. 237–239° C. (dec.).

Utilizing the preparative methods described under Examples 1 through 6 herein, the following related 1-[(4-amino-1-naphthylamino)alkyl]piperazines can be prepared, starting from the corresponding 1-[4-azo- or 4-nitro-1-naphthylamino)alkyl]-piperazines:

4-[2-(4-amino-1-naphthylamino)ethyl]-1-piperazineethanol, trihydrochloride
1-[3-(4-amino-1-naphthylamino)propyl]-4-methylpiperazine, trihydrochloride
1-[2-(4-amino-7-chloro-1-naphthylamino)ethyl]-4-isopropylpiperazine, trihydrochloride
1-[2-(4-amino-1-naphthylamino)ethyl]piperazine, trihydrochloride, M.P. 283–285° C.
1-[2-(4-amino-1-naphthylamino)ethyl]-4-(2-diethylaminoethyl)piperazine, tetrahydrochloride
1-[5-(4-amino-1-naphthylamino)pentyl]piperazine, trihydrochloride
1-[2-(4-amino-1-naphthylamino)ethyl]-4-(3-piperidinopropyl)piperazine, tetrahydrochloride

Example 11

A solution of 37.4 g. (0.10 mole) of 1-[2-(4-phenylazo-1-naphthylamino)ethyl]-4-piperidonal is hydrogenated under the conditions of Example 5. The purified product, 1-[2-(4-amino-1-naphthylamino)ethyl]-4-piperidinol, trihydrochloride, M.P. 227–230° C., is a pale violet solid of formula:

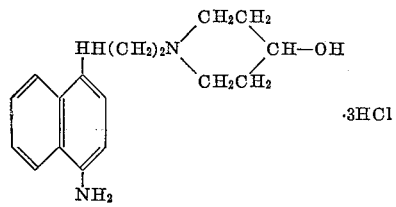

Utilizing the preparative methods described under Examples 1 through 6 herein, the following related 1-[(4-amino-1-naphthylamino)alkyl]piperidines can be prepared, starting from the corresponding 1-[(4-azo- or 4-nitro-1-naphthylamino)alkyl]piperidines:

1-[2-(4-amino-1-naphthylamino)ethyl]-4-methoxypiperidine, trihydrochloride
1-[3-(4-amino-1-naphthylamino)propyl]-3-piperidinol, trihydrochloride
1-[8-(4-amino-1-naphthylamino)octyl]-4-piperidinol, trihydrochloride
1-[3-(4-amino-naphthylamino)propyl]-3-methoxypiperidine, trihydrochloride
1-[2-(4-amino-1-naphthylamino)ethyl]-3-piperidinol, trihydrochloride
1-[3-(4-amino-1-naphthylamino)propyl]-4-piperidinemethanol, trihydrochloride
1-[3-(4-amino-1-naphthylamino)propyl]-4-piperidinol, trihydrochloride,
1-[3-(4-amino-1-naphthylamino)propyl]-4-piperidinepropanol, trihydrochloride

Example 12

A solution of 45.5 g. (0.10 mole) of p-{4-[2-dimethylamino-1-(dimethylaminomethyl)ethylamino]-1-naphthylazo}benzenesulfonic acid and 14 g. of triethylamine in methanol is hydrogenated according to the process of Example 2. Crystallization of the crude product from a mixture of methanol and ether containing an excess of hydrogen chloride gives the desired $N^2$-(4-amino-1-naphthyl)-$N^1,N^1,N^3,N^3$-tetramethyl-1,2,3-propanetriamine, trihydrochloride, of formula:

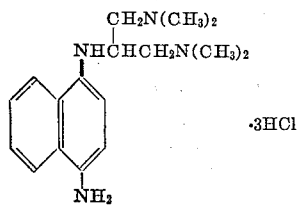

as a tan powder.

Utilizing the preparative methods described under Examples 1 through 6 herein, the following related N-(4-amino-1-naphthyl)tetraalkylalkanetriamines can be prepared, starting from the corresponding N-(4-azo- or 4-nitro-1-naphthyl)tetraalkylalkanetriamines:

$N^2$-(4-amino-1-naphthyl)-$N^1,N^1,N^3,N^3$-tetraethyl-1,2,3-propanetriamine, trihydrochloride
$N^2$-(4-amino-1-naphthyl)-$N^1,N^1,N^3,N^3$-tetrapropyl-1,2,3-propanetriamine, trihydrochloride
$N^3$-(4-amino-1-naphthyl)-$N^1,N^1,N^2,N^2$-tetraethyl-1,2,3-propanetriamine, trihydrochloride
$N^3$-(4-amino-1-naphthyl)-$N^1,N^1,N^5,N^5$-tetraethyl-1,3,5-pentanetriamine, trihydrochloride
$N^2$-(4-amino-1-naphthyl)-$N^1,N^1,N^3,N^3$-tetrabutyl-1,2,3-propanetriamine, trihydrochloride
1,1'-[3-(4-amino-1-naphthylamino)propylene]dipiperidine, trihydrochloride
N-[4-diethylamino-2-(2-diethylaminoethyl)butyl]-1,4-naphthalenediamine, trihydrochloride

Example 13

A solution of 24.0 g. (0.050 mole) of $N^1,N^1$-diethyl-$N^4$-(4-phenylazo-1-naphthyl)-1,4-pentanediamine, dihydrochloride, hydrate, in 300 ml. of methanol is hydrogenolyzed according to the procedure described in Example 5. Upon crystallization from a 2-propanolmethanol mixture containing hydrogen chloride, the desired N-(4-diethylamino-1-methylbutyl)-1,4-naphthalenediamine, of formula:

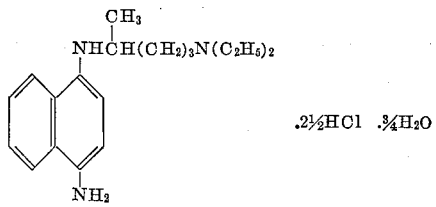

is obtained. This material contains 2½ moles of hydrogen chloride and ¾ mole of water of hydration, and melts at 183° C. with prior softening at 145° C.

Utilizing the preparative methods described under Examples 1 through 6 herein, the following related N-(dialkylaminoalkyl)-1,4-naphthalenediamines can be prepared, starting from the corresponding N,N-dialkyl-N'-(4-azo- or 4-nitro-1-naphthyl)alkanediamines:

N-(2-dimethylamino-1-methylethyl)-1,4-naphthalenediamine, trihydrochloride, M.P. 181–183° C.
N-(3-dimethylamino-2-methylpropyl)-1,4-naphthalenediamine, trihydrochloride, monohydrate, M.P. 260° C. (dec.)
1-[4-(4-amino-1-naphthylamino)-1-methylbutyl]piperidine, dihydrochloride
N-(4-diisobutylamino-1-methylbutyl)-1,4-naphthalenediamine, dihydrochloride
N-(4-diethylamino-1-ethylbutyl)-1,4-naphthalenediamine, dihydrochloride
N-[4-(ethylmethylamino)-1-methylbutyl]-1,4-naphthalenediamine, dihydrochloride
N-(4-diethylamino-1-isopropylbutyl)-1,4-naphthalenediamine, dihydrochloride
N-(4-diethylamino-1,4-dimethylbutyl)-1,4-naphthalenediamine, dihydrochloride

Example 14

A solution of 29 g. (0.084 mole) of 1-[2-(4-phenylazo-1-naphthylamino)ethyl]pyrrolidine in methanol is treated with hydrogen under the conditions of Example 1(a). The product, 1-[2-(4-amino-1-naphthylamino)ethyl]pyrrolidine, dihydrochloride, after recrystallization from a mixture of hydrochloric acid and 2-propanol, is obtained as a grey solid, of formula:

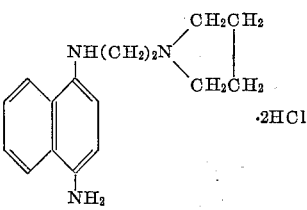

M.P. 293–296° C. (dec.).

Utilizing the preparative methods described under Examples 1 through 6 herein, the following related 1-[(4-amino-1-naphthylamino)alkyl]heterocyclic compounds can be prepared, starting from the corresponding 1-[(4-azo- or 4-nitro-1-naphthylamino)-alkyl]heterocyclic precursors:

1-[3-(4-amino-1-naphthylamino)propyl]pyrrolidine, dihydrochloride, monohydrate, M.P. 194° C. (dec.)
1-[3-(4-amino-1-naphthylamino)ethyl]-3-pyrrolidinol, dihydrochloride
1-[2-(4-amino-1-naphthylamino)ethyl]-1-azaspiro-[4.5]decane, dihydrochloride
1-[6-(4-amino-1-naphthylamino)hexyl]pyrrolidine, dihydrochloride
2-[(4-amino-1-naphthylamino)methyl]-1-methylpyrrolidine, dihydrochloride
2-[2-(4-amino-1-naphthylamino)ethyl]-1-propylpyrrolidine, dihydrochloride

Example 15

A solution of 38 g. (0.10 mole) of 1-diethylamino-3-(4-phenylazo-1-naphthylamino)-2-propanol in methanol is hydrogenolyzed according to the method of Example 1(a). The product, 1-(4-amino-1- naphthylamino)-3-diethylamino-2-propanol, trihydrochloride, of formula:

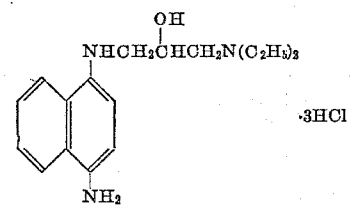

is an off-white, crystalline solid.

Utilizing the preparative methods described under Examples 1 through 6 herein, the following related compounds can be prepared, starting from the corresponding 4-azo- or 4-nitro-1-naphthylamine precursors:

1-(4-amino-1-naphthylamino)-3-diethylamino-2-methyl-2-propanol, trihydrochloride
1-(4-amino-1-naphthylamino)-4-diethylamino-3-methyl-2-butanol, trihydrochloride
1-(4-amino-1-naphthylamino)-3-piperidino-2-propanol, trihydrochloride
2-{[4-(4-amino-1-naphthylamino)pentyl]ethylamino}-ethanol, trihydrochloride
2-{[3-(4-amino-1-naphthylamino)propyl]hexylamino}-ethanol, trihydrochloride
2,2'-[6-(4-amino-1-naphthylamino)hexylimino]diethanol, trihydrochloride

Example 16

A solution of 7.0 g. (0.020 mole) of N-allyl-N-ethyl-N'-(4-phenylazo-1-naphthyl)ethylenediamine in 100 ml. of hot ethanol is reduced in the manner described under Example 1(b). The crude product is crystallized from a mixture of methanol and 2-propanol containing excess hydrogen chloride to give the desired N-[2-(allyl-ethylamino)ethyl]-1,4-naphthalenediamine, of formula:

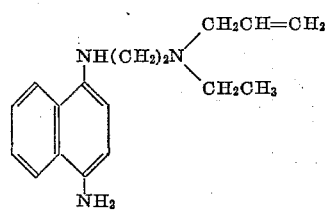

as a light grey solid, M.P. 216–218° C., which contains 2½ moles of hydrogen chloride.

Utilizing the preparative methods described under Examples 1 through 6 herein, the following related N-[(allylalkylamino)alkyl]-1,4-naphthalenediamines can be prepared, starting from the appropriate N-allyl-N'-(4-azo- or 4-nitro-1-naphthyl)alkanediamines:

N-[3-(allylmethylamino)propyl]-1,4-naphthalenediamine, dihydrochloride
N-[2-(allylcyclohexylamino)ethyl]-1,4-naphthalenediamine, dihydrochloride
N-[2-(diallylamino)ethyl]-1,4-naphthalenediamine, dihydrochloride
N-[3-(allylpropylamino)-2,2-dimethylpropyl]-1,4-naphthalenediamine, dihydrochloride
N-{2-[bis(2-methylallyl)amino]ethyl}-1,4-naphthalenediamine, dihydrochloride
N-[6-(diallylamino)hexyl]-1,4-naphthalenediamine, dihydrochloride

Example 17

A solution of 35.8 g. (0.10 mole) of 3-(4-phenylazo-1-naphthylamino)-N-ethylpiperidine in methanol is hydrogenated in the manner given in Example 1(a). The desired product, 3-(4-amino-1-naphthylamino)-N-ethylpiperidine, trihydrochloride, of formula:

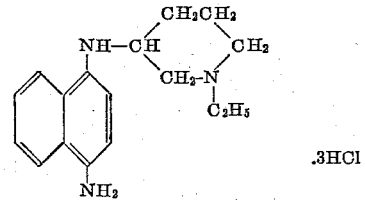

is obtained as a pale violet solid upon crystallization from a 2-propanol-ethanol-hydrogen chloride mixture.

Utilizing the preparative methods described under Examples 1 through 6 herein, the following related (4-amino-1-naphthylamino)-piperidines can be prepared, starting from the appropriate (4-azo- or 4-nitro-1-naphthylamino) piperidines:

4-(4-amino-1-naphthylamino)-1-methylpiperidine, trihydrochloride
4-[(4-amino-1-naphthylamino)methyl]-1-methylpiperidine, trihydrochloride
2-[3-(4-amino-1-naphthylamino)propyl]-1-methylpiperidine, trihydrochloride
3-[4-amino-1-naphthylamino)methyl]-N-methylpiperidine, trihydrochloride
4-[3-(-amino-1-naphthylamino)propyl]-1-methylpiperidine, trihydrochloride
3-[3-(4-amino-1-naphthylamino)propyl]-1-methylpiperidine, trihydrochloride

Example 18

A solution of 36.2 g. (0.10 mole) of 2-{ethyl[2-(4-phenylazo-1-naphthylamino)ethyl]amino}ethanol in 300 ml. of methanol is reduced according to the procedure of Example 6. The product, 2{[2-(4amino-1-naphthylamino)ethyl]ethylamino}-ethanol, dihydrochloride, is obtained as a pale lavender solid, M.P. 213–216° C., after crystallization from a mixture of methanol and 2-propanol. It is represented by the formula:

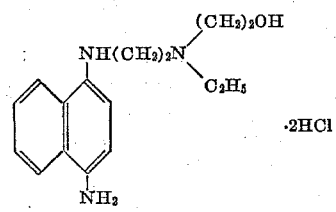

Utilizing the preparative methods described under Examples 1 through 6 herein, the following related {[(4-amino - 1 - naphthylamino)alkyl]alkyl}aminoalkanols can be prepared, starting from the corresponding {alkyl-

[(4-arylazo-, 4-heterocyclicazo-, or 4-nitro-1-naphthyl-amino)alkyl]amino}alkanols:

2-{[2-(4-amino-1-naphthylamino)ethyl]methylamino}-ethanol, trihydrochloride, ⅓ hydrate, M.P. 213–214° C.
2-{[3-(4-amino-1-naphthylamino)propyl]pentyl-amino}-ethanol, dihydrochloride
2,2'-[2-(4-amino-1-naphthylamino)ethylimino]diethanol, dihydrochloride
2-{2-{[2-(4-amino-1-naphthylamino)ethyl]ethylamino}-ethoxy}ethanol, dihydrochloride
1-{[2-(4-amino-1-naphthylamino)ethyl]ethylamino}-3-methoxy-2-propanol, dihydrochloride
2-{[2-(4-amino-1-naphthylamino)ethyl](2-ethoxyethyl)-amino}ethanol, dihydrochloride

Example 19

A solution of 43.4 g. (0.10 mole) of N,N-bis(2-ethoxyethyl)-N'-(4-phenylazo-1 - naphthyl)ethylenediamine in methanol is hydrogenated according to the directions of Example 5. Purification of the crude material is accomplished by crystallization from a mixture of ethanol and ether containing hydrogen chloride. This product, N - {2 - [bis(2 - ethoxyethyl)amino]ethyl} - 1,4 - naphthalene-diamine, dihydrochloride, is obtained as an off-white solid and has the formula:

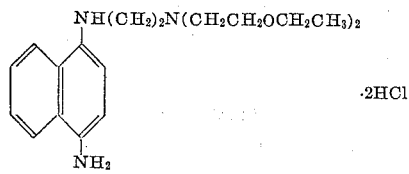

Utilizing the preparative methods described under Examples 1 through 6 herein, the following related N-alkoxyalkyl-1,4-naphthalenediamines can be prepared, starting from the corresponding (4-phenylazo- or 4-nitro-1-naphthyl)alkanediamines:

N-[2-(2-ethoxyethylethylamino)ethyl]-1,4-naphthalene-diamine, dihydrochloride
N-(2-diethylamino-1-methoxymethylethyl)-1,4-naphthalenediamine, dihydrochloride
N-{2-[bis(2-methoxyethyl)amino]ethyl}-1,4-naphthalenediamine, dihydrochloride
N-{2-[isopropyl(tetrahydrofurfuryl)amino]ethyl}-1,4-naphthalenediamine, dihydrochloride
N-[2-dimethylamino-1-(methoxymethyl)ethyl]-1,4-naphthalenediamine, dihydrochloride
N-{3-[(6-methoxyhexyl)ethylamino]propyl}-1,4-naphthalenediamine, dihydrochloride
N-{6-[bis(2-methoxyethyl)amino]hexyl}-1,4-naphthalenediamine, dihydrochloride

Example 20

A mixture of 10 g. (0.027 mole) of 1-[3-(4-phenylazo-1-naphthylamino)propyl]piperidine and 1.0 g. of Raney nickel is hydrogenated according to the process of Example 1(a). Crystallization of the crude compound from methanol yields the desired 1-[3-(4-amino-1-naphthyl-amino)propyl]piperidine, trihydrochloride, of formula:

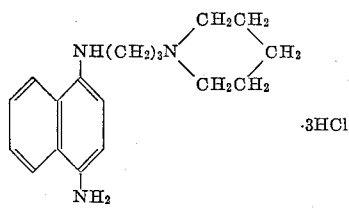

as a pale yellow solid, M.P. 198–210° C. (dec.).

In like manner the following related 1-[(4-amino-1-naphthylamino)alkyl]piperidines and pyrrolidines can be prepared, starting from the appropriate 1-[(4-azo- or 4-nitro-1-naphthylamino)alkyl]piperidines or pyrrolidines:

3-[(4-amino-1-naphthylamino)methyl]-1-methyl-pyrrolidine, trihydrochloride
1-[5-(4-amino-1-naphthylamino)pentyl]piperidine, trihydrochloride
2-[(4-amino-1-naphthylamino)methyl]-1-methyl-piperidine, trihydrochloride
1-[3-(4-amino-1-naphthylamino)propyl]-5-ethyl-2-pipecoline, trihydrochloride
3-[2-(4-amino-1-naphthylamino)ethyl]-3-azaspiro[5.5]-undecane, trihydrochloride
1-[2-(4-amino-1-naphthylamino)ethyl]-3,3-dimethyl-piperidine, trihydrochloride

Example 21

A solution of 38.6 g. (0.10 mole) of N-cyclohexyl-N-methyl - N' - (4 - phenylazo-1-naphthyl)ethylenediamine, monohydrochloride, in methanol is hydrogenated according to the procedure of Example 5. The product, N-(2-cyclohexylmethylaminoethyl) - 1,4 - naphthalenediamine, trihydrochloride, hydrate, is an off-white, crystalline solid, of formula:

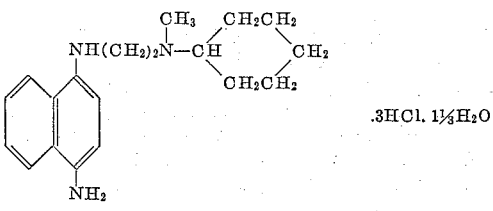

M.P. 250–255° C.

Utilizing the preparative methods described under Examples 1 through 6 herein, the following related N-(cycloalkylalkylaminoalkyl)-1,4-naphthalenediamines can be prepared, starting from the corresponding N-cycloalkyl-N-alkyl-N'-(4-azo- or 4-nitro-1-naphthyl)alkanediamines:

N-[3-(cyclopentylmethylamino)propyl]-1,4-naphthalenediamine, trihydrochloride
N-[2-(cyclohexylisobutylamino)ethyl]-1,4-naphthalenediamine, trihydrochloride
N-[2-(cyclopentylethylamino)ethyl]-1,4-naphthalenediamine, trihydrochloride
N-[2-(dicyclohexylamino)ethyl]-1,4-naphthalenediamine, trihydrochloride
N-[2-(dicyclopentylamino)ethyl]-1,4-naphthalenediamine, trihydrochloride

Example 22

A mixture of 23.4 g. (0.05 mole) of p-[4-(5-diethylaminopentylamino) - 1-naphthylazo]benzenesulfonic acid and 7 ml. of triethylamine in methanol is hydrogenated in the manner described in Example 2. The product, N-(5-diethylaminopentyl) - 1,4-naphthalenediamine, trihydrochloride, monohydrate, of formula:

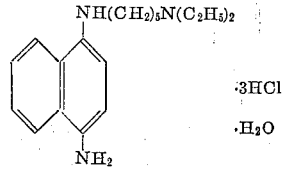

is obtained as a grey powder, M.P. 169–171° C., upon crystallization from a 2-propanol-ethanol mixture containing an excess of hydrogen chloride.

Utilizing the preparative methods described under Examples 1 through 6, the following related N-(dialkyl-aminoalkyl) - 1,4 - naphthalenediamines can be prepared, starting from the appropriate N,N-dialkyl-N'-(4-azo- or 4-nitro-1-naphthyl)alkanediamines:

N-(5-dimethylaminopentyl)-1,4-naphthalenediamine, trihydrochloride
N-(8-diethylaminooctyl)-1,4-naphthalenediamine, trihydrochloride
N-(6-dibutylaminohexyl)-1,4-naphthalenediamine, trihydrochloride N-[5-(methylpropylamino)pentyl]-1,4-naphthalenediamine, trihydrochloride N-(7-diethylaminoheptyl)-1,4-naphthalenediamine, trihydrochloride N-[6-(isopropylmethylamino)hexyl]-1,4-naphthalenediamine, trihydrochloride N-(6-diethylaminohexyl)-1,4-naphthalenediamine, trihydrochloride

Example 23

A solution of 38.1 g. (0.10 mole) of N,N-diethyl-N'-(6 - chloro - 4 - phenylazo-1-naphthyl)ethylenediamine in ethanol is hydrogenated in the manner given in Example 5. The product, 6-chloro-$N^1$-(2-diethylaminoethyl)-1,4-naphthalenediamine, dihydrochloride, of formula:

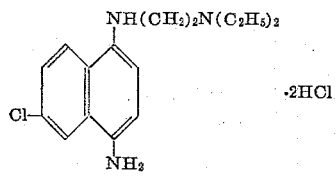

is obtained as an off-white solid upon crystallization from a mixture of methanol and ether.

Utilizing the preparative methods described under Examples 1 through 6 herein, the following related N-(dialkylaminoalkyl) - 1,4-naphthalenediamines can be prepared, starting from the appropriate N,N-dialkyl-N'-(4-azo- or 4-nitro-1-naphthyl)alkanediamines:

5-methyl-$N^4$-(2-diisopropylaminoethyl)-1,4-naphthalenediamine, dihydrochoride 6-bromo-$N^1$-(2-dimethylaminoethyl)-1,4-naphthalenediamine, dihydrochloride $N^1$-(2-diethylaminoethyl)-8-bromo-1,4-naphthalenediamine, trihydrochloride $N^1$-(2-diethylaminoethyl)-7-methyl-1,4-naphthalenediamine, trihydrochloride $N^1$-(2-diethylaminoethyl)-8-chloro-1,4-naphthalenediamine, trihydrochloride

Example 24

A mixture of 42.6 g. (0.10 mole) of p-{4-[2-(isopropylmethylamino)ethylamino] - 1 - naphthylazo}benzenesulfonic acid, 14 ml. of triethylamine and 2 g. of Raney nickel in methanol is treated with hydrogen according to the directions of Example 2. Crystallization of the crude product from a mixture of ethanol and 2-propanol containing excess hydrogen chloride gives the desired N-[2-(isopropylmethylamino)ethyl] - 1,4 - naphthalenediamine, dihydrochloride, of formula:

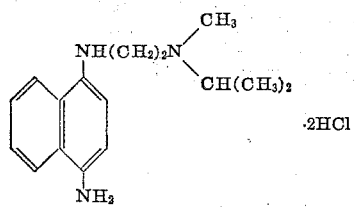

as light grey crystals, M.P. 230° C. (dec.).

Utilizing the preparative methods described under Examples 1 through 6, two related N-[(dialkylamino)alkyl]-1,4-naphthalenediamines can be prepared, starting from the appropriate N,N - dialkyl-N' - (4-azo- or 4 - nitro-1-naphthyl)alkanediamines:

N-[2-(butylmethylamino)ethyl]-1,4-naphthalenediamine, dihydrochloride, M.P. 220–230° C.

N-[2-(ethylmethylamino)ethyl]-1,4-naphthalenediamine, dihydrochloride, M.P. 245–255° C.

Example 25

A mixture of 56.9 g. (0.10 mole) of p-{4-[2-bis(diethylaminoethyl)aminoethylamino] - 1 - naphthylazo}benzenesulfonic acid and 14 ml. of triethylamine is treated in the manner described in Example 2. The product, 1-(4-amino-1-naphthyl)-4-(2-diethylaminoethyl) - 7,7-diethyldiethylenetriamine, tetrahydrochloride, upon crystallization from a 2-propanol-methanol mixture containing an excess of hydrogen chloride, is obtained as an off-white, hygroscopic solid, of formula:

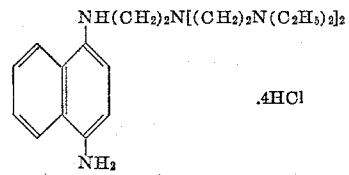

Utilizing the preparative methods described under Examples 1 through 6 herein, the following related 1,4-naphthalenediamines can be prepared, starting from the corresponding 4-azo- or 4-nitro-1-naphthylamines:

1-(4-amino-1-naphthyl)-7,7-diethyldiethylenetriamine, trihydrochloride 1-(4-amino-1-naphthyl)-4,7,10,10-tetraethyltriethylenetetramine, tetrahydrochloride 1,1'-{[2-(4-amino-1-naphthylamino)ethylimino]bis(trimethylene)}dipiperidine, tetrahydrochloride N-{3-[bis(3-diethylaminopropyl)amino]propyl}-1,4-naphthalenediamine, tetrahydrochloride N-{2-[bis(2-dimethylaminoethyl)amino]ethyl}-1,4-naphthalenediamine, tetrahydrochloride

Example 26

A mixture of 10 g. (0.03 mole) of 1-[2-(4-phenylazo-1-naphthylamino)ethyl]piperidine and 1.0 g. of Raney nickel is hydrogenated according to the process of Example 1 (a). Crystallization of the crude compound from methanol gives the desired 1-[2-(4-amino-1-naphthylamino)ethyl]piperidine, dihydrochloride, of formula:

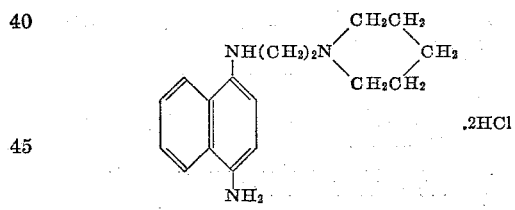

as a beige crystalline solid, M.P. 275–280° C. (dec.).

In like manner the following related 1-[(4-amino-1-naphthylamino)alkyl]piperidine hydrochlorides can be prepared, starting from the appropriate 1-[(4-azo- or 4-nitro-1-naphthylamino)alkyl]-piperidines:

1 - [2-(4-amino-1-naphthylamino)ethyl]-4-pipecoline, dihydrochloride, ¼ hydrate, M.P. 289–291° C.

1-[2-(4-amino-1-naphthylamino)ethyl]-3-(1-methyl-2-pyrrolidinyl)piperidine, trihydrochloride 1-[2-(4-amino-1-naphthylamino)ethyl]-2,4,6-trimethylpiperidine, dihydrochloride 1-[3-(4-amino-1-naphthylamino)propyl]-2-pipecoline, dihydrochloride 1-[3-(4-amino-1-naphthylamino)propyl]-4-pentylpiperidine, dihydrochloride 1-[2-(4-amino-1-naphthylamino)ethyl]-2-(2-methoxyethyl)-piperidine, dihydrochloride

Example 27

A mixture of 48.2 g. (0.10 mole) of p-{4-{2-[4-(2-hydroxyethyl) - 1 - homopiperazinyl]ethylamino}-1-naphthylazo}benzene-sulfonic acid, 14 ml. of triethylamine, and 3 g. of Raney nickel is hydrogenated according to the process of Example 2. Upon crystallization from a mixture of ethanol and either containing an excess of hydrogen chloride, the product, 4-[2-(4-amino-1-naphthylamino)ethyl]-1-homopiperazineethanol, trihydrochloride, of formula:

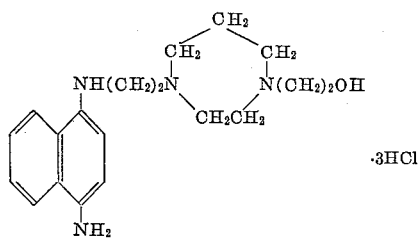

·3HCl is obtained as an off-white crystalline solid.

Utilizing the preparative methods described under Examples 1 through 6 herein, the following related [(4-amino-1-naphthylamino)alkyl]heterocyclic compounds can be prepared, starting from the corresponding [4-azo- or 4-nitro-1-naphthylamino)alkyl]heterocyclic precursors:

1-[2-(4-amino-1-naphthylamino)ethyl-4-methyl-homopiperazine, trihydrochloride
1-[2-(4-amino-1-naphthylamino)ethyl]homopiperazine, trihydrochloride
1-[2-(4-amino-1-naphthylamino)ethyl]-1-azaspiro[4.4]nonane, dihydrochloride
1-[2-(4-amino-1-naphthylamino)ethyl]-4-(1-pyrrolidinyl)-piperidine, trihydrochloride
1-{2-(4-amino-1-naphthylamino)ethyl}hexahydroindoline, dihydrochloride
1-[2-(4-amino-1-napthylamino)ethyl]-4-ethyl homopiperazine, trihydrochloride
1-[(4-amino-1-naphthylamino)methyl]octahydroquinazoline, dihydrochloride
1-[2-(4-amino-1-naphthylamino)ethyl]octahydroquinazoline, dihydrochloride

*Example 28*

A solution of 15 g. (0.029 mole) of 1-[2-(4-phenylazo-1-naphthylamino)ethyl]hexamethyleneimine, dihydrochloride, in methanol is hydrogenated under the conditions given in Example 6. The product, 1-[2-(4-amino-1-naphthylamino)ethyl]hexamethyleneimine, dihydrochloride, of formula:

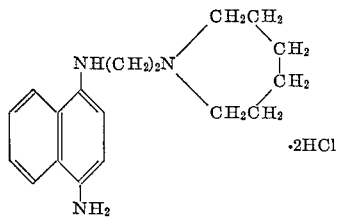

·2HCl is obtained as a beige, crystalline solid, M.P. 280° C. with prior softening at 255° C., after crystallization from a 2-propanol-methanol mixture.

Utilizing the preparative methods described under Examples 1 through 6 herein, the following related 1-[4-amino-1-naphthylamino)alkyl]heterocyclic compounds can be prepared, starting from the appropriate 1-[(4-azo- or 4-nitro-1-naphthylamino)-alkyl]heterocyclic compounds:

3-[2-(4-amino-1-naphthylamino)ethyl]-3-azabicyclo-[3.3.1]nonane, dihydrochloride
3-[2-(4-amino-1-naphthylamino)ethyl]-3-azabicyclo-[3.3.2]nonane, dihydrochloride
1-[6-(4-amino-1-naphthylamino)hexyl]hexamethyleneimine, dihydrochloride
2-[2-(4-amino-1-naphthylamino)ethyl]decahydroisoquinoline, dihydrochloride
2-[2-(4-amino-1-naphthylamino)ethyl]octahydrocyclopenta[c]-pyrrole, dihydrochloride
1-[2-(4-amino-1-naphthylamino)ethyl]decahydroquinoline, dihydrochloride
1-(4-amino-1-naphthylamino)hexahydro-1H-pyrrolizine, dihydrochloride

*Example 29*

A solution of 40.4 g. (0.10 mole) of N,N-diethyl-2-methoxy - N' - (4 - phenylazo - 6 - methyl - 1 - naphthyl) propanediamine in methanol is hydrogenated in accordance with the process of Example 6. The product, $N^1$ - (3 - diethylamino - 2 - methoxypropyl) - 6 - methyl - 1, 4 - naphthalenediamine, dihydrochloride, upon crystallization from a mixture of 2-propanol and methanol, is obtained as a tan, crystalline solid, of formula:

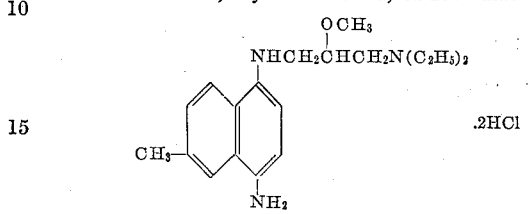

·2HCl

Utilizing the preparative methods described under Examples 1 through 6 herein, the following related compounds can be prepared, starting from the corresponding (4-phenylazo- or 4-nitro-1-naphthyl)alkanediamines:
N{[1 - (diethylaminomethyl)cyclohexyl]methyl} - 1,4-naphthalenediamine, dehydrochloride
N - (3 - diethylamino - 2 - ethoxypropyl) - 1,4 - naphthalenediamine, dihydrochloride
N - {[4 - (diethylaminomethyl)cyclohexyl]methyl} - 1,4-naphthalenediamine, dihydrochloride
N - [2 - diethylamino - 1 - (methoxymethyl)ethyl] - 1,4-naphthalenediamine, dihydrochloride
1 - (4 - amino - 1 - naphthylamino) - 4 - diethylamino-3-methyl-2-butanol, dihydrochlordie
4 - (4 - amino - 1 - naphthylamino) - 1 - diethylamino-2-butonal dihydrochloride

*Example 30*

A solution of 44.2 g. (0.10 mole) of 1' - [2 - (4 - phenylazo-1-naphthylamino)ethyl]-1,4-bipiperidine in methanol is hydrogenated in the manner given under Example 1(a). The desired 1' - [2 - (4 - amino - 1 - napthylamino)ethyl] - 1,4' - bipiperidine, trihydrochloride, of formula:

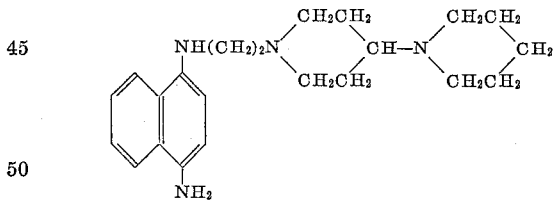

is obtained as a colorless crystalline solid upon crystallization from a 2-propanol-hydrogen chloride mixture.

Utilizing the preparative methods described under Examples 1 through 6 herein, the following related [(4-amino - 1 - naphthylamino) - alkyl]piperidines can be prepared, starting from the appropriate [(4-azo- or 4-nitro-1-naphthylamino)alkyl]piperidines:

1 - [2 - (4 - amino - 1 - naphthylamino)ethyl] - 4 - dimethylamino-piperidine, trihydrochloride
1 - [2 - (4 - amino - 1 - naphthylamino)ethyl] - 1'-methyl-2,4'-bipiperidine, trihydrochloride
1' - [2 - (4 - amino - 1 - naphthylamino)ethyl] - 1-methyl-2,4'-bipiperidine, trihydrochloride
1 - [2 - (4 - amino - 1 - naphthylamino)ethyl] - 4,4' - bipiperidine, trihydrochloride
1 - [2 - (4 - amino - 1 - naphthylamino)ethyl] - 1'-methyl-4,4'-bipiperidine, trihydrochloride
4 - {[2 - (4 - amino - 1 - naphthylamino)ethyl] - methylamino}-1-methylpiperidine, trihydrochloride
1' - [3 - (4 - amino - 1 - naphthylamino)propyl] - 1,4'-bipiperidine, trihydrochloride
1 - [3 - (4 - amino - 1 - naphthylamino)propyl] - 1'-methyl-4,4'-bipiperidine, trihydrochloride

We claim:
1. A member selected from the class consisting of free bases of the formula:

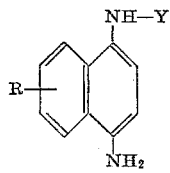

and pharmaceutically acceptable acid addition salts thereof;
wherein Y represents a member of the group consisting of:

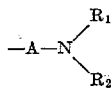

and

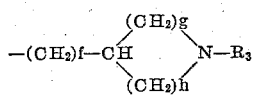

A represents a member selected from the group consisting of alkylene of 2 to 8 carbon atoms inclusive and alkylene of 3 to 6 carbon atoms inclusive in which one of the non-terminal methylene groups is replaced by a member selected from the class consisting of —O—, —S—, =CHOH, =COH(lower alkyl), =N(lower alkyl), and =CH(diloweralkylaminoalkyl);
R represents a member selected from the group consisting of hydrogen, methyl, chloro and bromo;
$R_1$ and $R_2$ each represent a member selected from the group consisting of
 (1) alkyl, alkoxyalkyl, hydroxyalkyl, and cycloalkyl, said members having fewer than 7 carbon atoms,
 (2) as further members the allyl radical, the methallyl radical, and lower dialkylaminoalkyl of 3 to 7 alkyl carbon atoms inclusive,
 (3) and still further members wherein $R_1$ and $R_2$ in combination with the nitrogen atom to which they are attached represent a member selected from the class consisting of: pyrrolidino, piperidino, hexamethyleneimino, morpholino, piperazino, homopiperazino, decahydroquinolinyl, decahydroisoquinolinyl, azabicyclooctyl, azabicyclononyl, azabicyclodecyl, hexahydroindolinyl, octahydroquinazolinyl, azaspiranonyl, azaspiradecyl, azaspiraundecyl and octahydrocyclopentapyrrolyl, and lower alkyl, lower hydroxyalkyl, lower alkoxyalkyl, hydroxy, lower alkoxy, amino, and lower dialkylaminoalkyl substituted derivatives thereof;
$f$ represents an integer from 0 to 3 inclusive;
$g$ and $h$ represent integers such that the sum of $g$ and $h$ is an integer from 3 to 4;
and $R_3$ represents a member selected from the group consisting of lower alkyl, lower hydroxyalkyl, lower alkoxyalkyl, and lower dialkylaminoalkyl.

2. 1 - (2 - diethylaminoethyl) - 1,4 - naphthalenediamine, dihydrochloride.
3. 1 - [2 - (4 - amino - 1 naphthylamino) - ethyl]-pyrrolidine, dihydrochloride.
4. N - [2 - (isopropylmethylamino) - ethyl] - 1,4-naphthalenediamine, dihydrochloride.
5. N - (3 - diethylamino - 2,2 - dimethylpropyl) - 1,4-naphthalenediamine, trihydrochloride.
6. 1 - [3 - (4 - amino - 1 - naphthylamino)propyl]-pyrrolidine, dihydrochloride, monohydrate.

References Cited by the Examiner
UNITED STATES PATENTS
1,757,394  5/1930  Schulemann et al. __ 260—570.5

FOREIGN PATENTS
547,301  8/1942  Great Britain.
868,884  5/1961  Great Britain.

ALEX MAZEL, *Primary Examiner.*
MARY U. O'BRIEN, *Assistant Examiner.*